US007097170B2

(12) United States Patent
Glaser et al.

(10) Patent No.: US 7,097,170 B2
(45) Date of Patent: Aug. 29, 2006

(54) LOCKABLE MOUNT PLATE

(75) Inventors: Donald J. Glaser, Emporia, KS (US); Lon C. Tidwell, Emporia, KS (US)

(73) Assignee: Glendo Corporation, Emporia, KS (US)

( * ) Notice: Subject to any disclaimer, the term of this patent is extended or adjusted under 35 U.S.C. 154(b) by 91 days.

(21) Appl. No.: 10/604,660

(22) Filed: Aug. 7, 2003

(65) Prior Publication Data

US 2005/0029726 A1 Feb. 10, 2005

(51) Int. Cl.
*B23Q 1/25* (2006.01)
*B25B 1/22* (2006.01)

(52) U.S. Cl. ................................ 269/71; 269/3; 269/6

(58) Field of Classification Search .................. 269/71, 269/95, 3, 6, 76, 97, 101
See application file for complete search history.

(56) References Cited

U.S. PATENT DOCUMENTS 4,744,552 A * 5/1988 Glaser ......................... 269/71
4,844,397 A * 7/1989 Skakoon et al. ....... 248/231.71
5,628,418 A * 5/1997 Deschamps et al. ......... 220/3.2
6,648,318 B1 * 11/2003 Oetlinger et al. ............. 269/41

* cited by examiner

*Primary Examiner*—Lee D. Wilson
(74) *Attorney, Agent, or Firm*—Hovey Williams LLP

(57) ABSTRACT

17A lockable mount (10) constructed in accordance with the principles of a preferred embodiment of the present invention and configured for mounting a jewelry crafting attachment (12) to a workbench (B). The illustrated lockable mount (10) broadly includes a mount plate (14) configured to be coupled to the support (B) to receive the attachment (12) and a locking assembly (16) associated with the mount plate (14) for selectively preventing the attachment (12) from moving relative to the mount plate (14). The illustrated mount plate (14) is configured to provide a universal mount wherein several attachments can be quickly and readily interchanged for secure support thereon and comprises a six sided body presenting a generally trapezoidal configuration. The illustrated locking assembly (16) includes a flexible locking plate (36), an entrapped pin (38), and an actuating screw (40). The flexible locking plate (36) is shiftable between a flush position and a locking position. The inventive mount (10) provides a universal lockable mount that allows for quick and easy interchange among various mountable attachments yet also enables any one of the attachments to be selectively locked to the mount (10) for a secure mount that generally prevents undesired movement of the attachment.

10 Claims, 1 Drawing Sheet

LOCKABLE MOUNT PLATE

BACKGROUND OF INVENTION

1. Field of the Invention

The present invention relates generally to apparatus for mounting equipment to a support and especially for mounting equipment for crafting and repairing jewelry, or for artistic handwork including engraving. More specifically, the present invention concerns a lockable mount that enables the equipment to be normally removably mounted on the support and selectively locked thereto for a secure mount that generally prevents undesired movement of the equipment relative to the support.

2. Discussion of Prior Art

In many applications, a craftsman will desire to mount a piece of equipment to a support, such as a workbench, in order to better utilize the equipment for the selected crafting application. For example, jewelry craftsmen typically mount one of several jewelry crafting attachments to their workbench for performing various jewelry crafting operations therewith. It is often desirable to enable the various attachments to be quickly and easily interchanged on a single, universal mount located at an optimal working position on the bench.

Prior art mounts that enable various attachments to be interchanged on the single mount are known in the art. One such universal mount is described in U.S. Pat. No. 4,744,552, assigned of record to the assignee of the present invention, issued May 17, 1988 and entitled CRAFTSMAN'S JEWELRY SUPPORT TOOL ("Glaser '552 patent"). The mount (38) disclosed in the Glaser ''552 patent includes convergent sides that enable a jewelry crafting attachment, such as the articulating frame (14) described therein, fitted with dovetailing shoes (34) to be quickly slid onto the mount (38). The mount (38) of the Glaser '552 patent further enables various crafting attachments to be readily interchanged on the mount by simply sliding the previous attachment off the mount and replacing it with the next attachment fitted with the dovetailing shoes. Such quick interchange is desirable because a jewelry craftsman will often utilize several attachments in a single sitting, such as the articulating frame (14), a bench pin, an engraving block shelf, a solder station, a multi-purpose vise, a saw plate, etc.

However, it has been determined that jewelry craftsmen increasingly are utilizing attachments that enable and require precise and fine positioning of the workpiece wherein virtually any movement of the attachment once the desired positioning of the workpiece is achieved is undesired. For example, such a precision jewelry crafting attachment is disclosed in applicants' contemporaneously filed application for U.S. patent Ser. No. 10/604,659, entitled HOLDER FOR SUPPORTING WORKPIECE IN A FIXED LOCATION PIVOTAL ABOUT DUAL AXES (the "Glaser Contemporaneous Application"), which is hereby incorporated by reference herein as is necessary for a full and complete understanding of the present invention. While the problems identified in the Glaser Contemporaneous Application primarily dealt with undesired movement of the workpiece, it has been determined that many of these same problems are also associated with undesired movement of the attachment relative to the bench.

Prior art mounts are problematic and subject to several undesirable limitations. For example, although some prior art mounts may enable a relatively quick interchange of attachments on a single mount, this quick interchange function undesirably enables the attachment to be readily moved relative to the mount, even if this movement is unintended. Such unintended movement of the attachment relative to the bench is undesirable, particularly during crafting applications that demand extremely precise work within relatively tight spaces on materials that are relatively expensive to replace if mistakes occur. Accordingly, it would be desirable to provide a mount that enables a quick interchange of attachments while also enabling one or more of the attachments to be secured to the bench in such a manner that prevents even the slightest of undesirable movement between the attachment and the bench.

SUMMARY OF INVENTION

The present invention provides an improved mount that does not suffer from the problems and limitations of the prior art mounts detailed above. The inventive mount provides a universal lockable mount that allows for quick and easy interchange among various mountable attachments yet also enables any one of the attachments to be selectively locked to the mount for a secure mount that generally prevents undesired movement of the attachment. In a preferred embodiment, the locking mechanism includes a flexible plate self-biased into an unlock position that is activated into a locked position by a screw, activated from the top of the mount, that adjustably forces an entrapped pin against the flexible plate.

A first aspect of the present invention concerns a lockable mounting apparatus for supporting structure relative to a support. The apparatus broadly includes a body adapted to be coupled to the support and operable to slidably receive the structure when coupled to the support and a locking assembly including a locking mechanism that selectively prevents the structure received on the body from sliding relative to the body in a first direction. The body is configured to generally prevent the structure received thereon from sliding relative to the body in a first plane but normally permitting the structure received thereon to slide relative to the body in the first direction. The first direction is generally divergent relative to the first plane. The body includes an exposed surface extending generally parallel to the first plane when the body is coupled to the support and the structure is received on the body. The locking assembly further includes an actuator in activating communication with the locking mechanism. At least a portion of the actuator is positioned adjacent the exposed surface.

A second aspect of the present invention concerns a lockable mounting apparatus for securely mounting a workpiece holding assembly to a fixed support. The apparatus broadly includes a mount adapted to be coupled to the support and operable to receive the workpiece holding assembly when coupled to the support, a flexible plate shiftably coupled to the mount, and a locking element operable to selectively shift the plate relative to the mount. The mount presents a body defining a back surface that engages the support when the mount is coupled thereto and an oppositely spaced, generally planar front surface. The body further defines an internal chamber presenting a normally open face. The flexible plate is shiftable between a flush position wherein the plate generally closes the open face and forms at least a portion of the planar front surface and a locking position wherein at least a portion of the plate is spaced from the front surface and spaced from the open face. The locking element is operable to selectively shift the plate from the flush position into the locking position. The locking element includes at least a portion thereof that is received in the chamber and engages the plate.

A third aspect of the present invention concerns an apparatus for supporting a workpiece and broadly includes a mount adapted to be coupled to a support and a frame assembly removably coupled to the mount and adapted to movably support the workpiece. The mount includes a mount plate received between the frame assembly and the support when the mount is coupled to the support. The frame assembly includes a frame plate slidably received on the mount plate and normally slidable in a first direction when received on the mount plate. The mount further includes a locking assembly including at least one element shiftably supported relative to the mount plate. The at least one element is selectably shiftable into and out of a locking position wherein the frame plate is prevented from sliding in the first direction.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION

Figure 1:
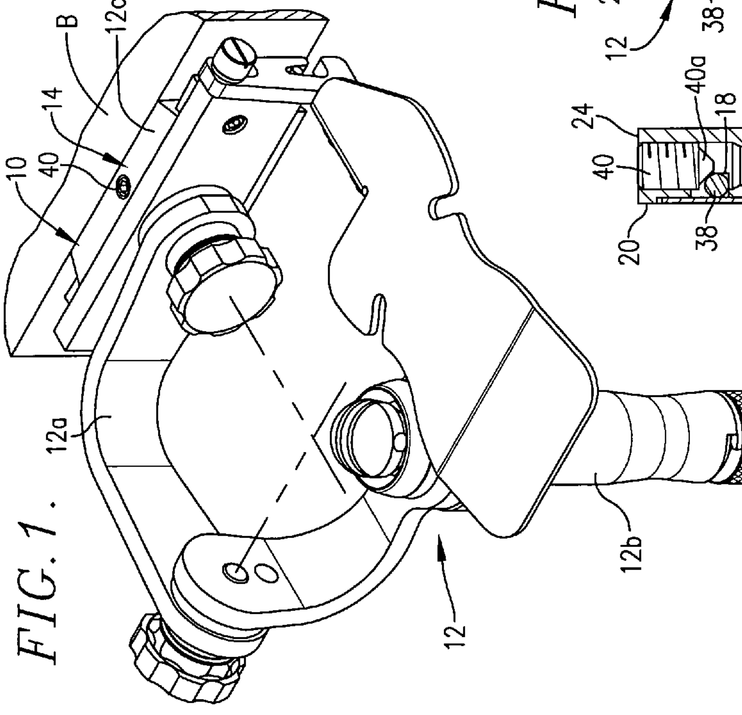
FIG. 1 is a perspective view of a lockable mount constructed in accordance with a preferred embodiment of the present invention and shown supporting a frame assembly attachment, laden with a workpiece supporting tool assembly, on a workbench (shown in fragmentary)

FIG. 1 illustrates a lockable mount 10 constructed in accordance with the principles of a preferred embodiment of the present invention and shown mounting a jewelry crafting attachment 12 to a workbench B. As further detailed below, the principles of the present invention are not limited to a mount for any particular attachment, nor are they limited to mounting jewelry crafting equipment. Although the principles of the present invention are particularly well suited for mounting jewelry crafting equipment, they equally apply to mounting any type of equipment wherein a secure, selectively lockable mount is desired without compromising any ability for a quick and easy interchange among various attachments. Additionally, the principles of the present invention are not limited to use with the illustrated support B, but could be applied to virtually any type of support wherein it is desirable to mount equipment thereto. The illustrated lockable mount 10 broadly includes a mount plate 14 configured to be coupled to the support B to receive the attachment 12 and a locking assembly 16 associated with the mount plate 14 for selectively preventing the attachment 12 from moving relative to the mount plate 14 (see FIGS. 1 and 3).

Turning initially to FIG. 1, the illustrated jewelry crafting attachment 12 shown mounted to the bench B by the mount 10 is an articulating frame assembly 12*a* laden with a workpiece supporting tool assembly 12*b*. A preferred frame assembly and tool assembly are disclosed in the Glaser Contemporaneous Application, previously incorporated by reference herein as is necessary for a complete understanding of the present invention. Another suitable frame assembly and tool assembly are disclosed in the Glaser ''552 patent, previously incorporated by reference herein. However, the principles of the present invention are not limited to any particular attachment, and as detailed below, the illustrated mount 10 is a universal mount designed to enable a quick and easy interchange between several related attachments. In the context of jewelry crafting, these multiple attachments may include one or more of a bench pin, an engraving block shelf, a solder station, a multi-purpose vise, a saw plate, or any other suitable jewelry crafting attachment (not shown).

As indicated above, the mount plate 14 is configured to be coupled to the bench B and to receive the attachment 12. In more detail, and perhaps as best shown in FIGS. 2–5, the illustrated mount plate 14 comprises a six sided body that defines an internal chamber 18. The sides are generally flat, planar surfaces and include a front surface 20, an oppositely spaced back surface 22, top and bottom surfaces 24 and 26, respectively, each extending between the front and back surfaces 20,22, and a pair of opposed side surfaces 28 and 30, respectively, each extending between the surfaces 20,22, 24,26. For purposes that will subsequently be described, formed in the front surface is a central plate-receiving recess 20*a* (see FIG. 3). As will be further detailed below, the internal chamber 18 is formed between the surfaces 20–30 and opens into the recess 20*a* . Located on either side of the recess 20*a* are a plurality of screw-receiving apertures 32 formed entirely through the plate 14. The illustrated apertures 32 are counter sunk to receive screws 34 for coupling the mount plate 14 to the workbench B (see FIG. 2). However, the mount plate 14 could be coupled to the support B in any suitable manner, including more permanently affixing the plate 14 to the bench B (e.g., weldment, etc.). The plate 14 is preferably formed of durable material of suitable strength to provide the desired support capabilities without marring or failure, such as an iron-type alloy (e.g., steel, stainless steel, etc.). However, the mount plate 14 could be formed of any suitable material.

As previously indicated, the illustrated mount plate 14 is configured to provide a universal mount wherein several attachments can be quickly and readily interchanged for secure support thereon. In this regard, the top and bottom surfaces 24,26 are generally trapezoidal in configuration with the minor dimension being positioned adjacent the bench B and the major dimension be positioned adjacent the attachment 12. That is to say, the back surface 22 is smaller in area than the front surface 20. In this manner, any attachment fitted with dovetailing shoes such as the opposing pair of shoes 12*c* of the frame assembly 12 illustrated in FIG. 1 as is well known in the art, can be slid over the top surface 24 so that the shoes 12*c* engage the side surfaces 28,30. In a similar manner, the front and back surfaces 20,22 are also generally trapezoidal in configuration so that the side surfaces 28,30 slope from the top surface 24 towards the bottom surface 26. This enables the shoes 12*c* to slide down the surfaces 28,30 until they securely engage therewith. In this regard, the mount plate 14 can securely receive attachment shoes within a range of variously spaced widths yet still provide a secure engagement with the side surfaces 28,30. The shoes 12c are preferably complementally angled to mirror the slope of the side surfaces 28,30 to provide an optimum secure engagement, however, with the inventive locking function provided by the lockable mount 10 as detailed below, such an optimum engagement is not necessary.

Once the shoes 12c are securely received on the mount plate 14 (as shown in FIG. 1), movement of the attachment 12 in the horizontal plane is substantially prevented. Additionally, downward movement of the attachment 12 in the vertical direction is also substantially prevented when the shoes 12c are securely received on the mount plate 14. However, the mount plate 14 normally i.e., when the locking assembly 16 is not in the locking position as subsequently described in detail enables the attachment 12 to be freely slid upward in the vertical direction towards the top surface 24. In this manner, the mount plate 14 enables the attachment 12 to be quickly and easily removed from the mount 10 by simply sliding the attachment 12 upward. Once the attachment 12 is removed from the mount 10, another attachment (not shown) can be readily mounted onto the mount 10 by simply sliding the replacement attachment onto the mount until the dovetailing shoes securely engage the side surfaces 28,30. Although this quick interchange ability is preferred, the mount plate 14 could be variously alternatively configured and the attachment(s) need not necessarily be received on the mount plate in a slidable manner.

Figure 3:
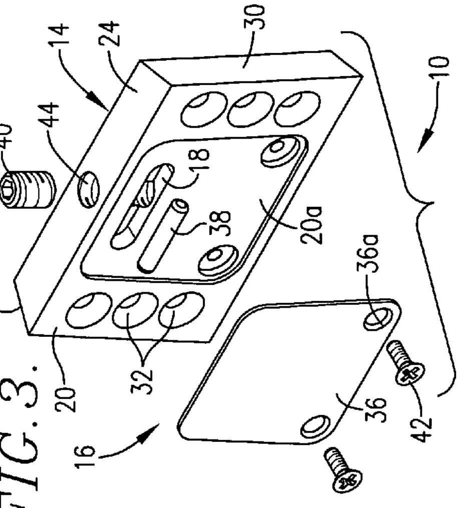
FIG. 3 is an exploded assembly view of the lockable mount illustrated in FIGS. 1 and 2.
Figure 5:
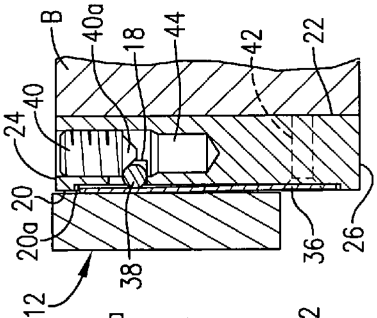
FIG. 5 is a sectional view of the lockable mount similar to FIG. 4 and shown with the frame assembly (shown in partial) and the workbench (shown in fragmentary) with the flexible lock plate in the locking position.
Figure 4:
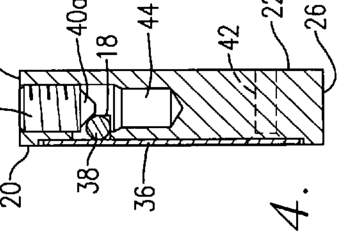
FIG. 4 is a latitudinal vertical sectional view of the lockable mount illustrated in FIGS. 1–3 with the flexible lock plate in the flush position.

Once the attachment 12 is received on the mount plate 14, the mount 10 enables the user to selectively lock the attachment 12 thereto to prevent any undesired movement of the attachment 12 relative to the mount plate 14, i.e., including any movement of the attachment upward in the vertical direction. In the illustrated mount 10, it is the locking assembly 16 associated with the mount plate 14 that provides this selective locking function. In more detail, and perhaps as best shown in FIGS. 3–5, the illustrated locking assembly 16 includes a flexible locking plate 36, an entrapped pin 38, and an actuating screw 40. The illustrated flexible locking plate 36 is a generally flat plate that is coupled to the mount plate 14 and shiftably received in the recess 20a thereof. In this regard, the locking plate 36 includes a pair of screw-receiving apertures 36a positioned generally towards the bottom of the locking plate 36 that are configured to receive screws 42 that anchor into the mount plate 14. The illustrated locking plate 36 is preferably flexible, such as formed from a metal configured to have some spring-like qualities, such as relatively thin sheet steel or the like. In this manner, the top portion of the locking plate 36 can shift, or pivot, relative to the front surface 20 of the mount plate 14 about the screws 42.

Figure 2:
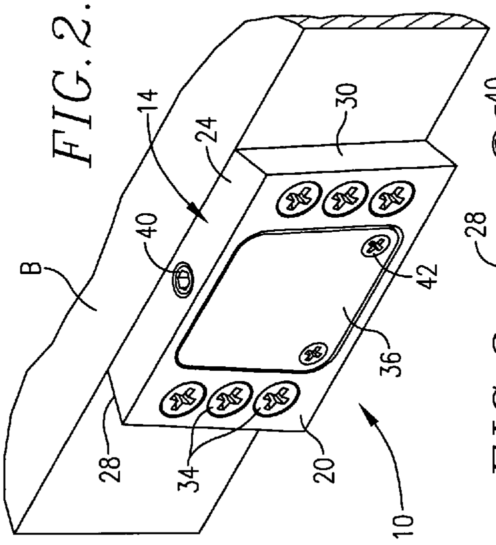
FIG. 2 is a perspective view of the lockable mount illustrated in FIG. 1 shown coupled to the workbench (shown in fragmentary) and illustrating the flexible lock plate in the flush position.

The flexible locking plate 36 is shiftable between a flush position as shown in FIGS. 2 and 4 and a locking position as shown in FIG. 5. When the locking plate 36 is in the flush position, the plate 36 is flushly received within the recess 20a and thus forms a part of the planar front surface 20. In this manner, when the locking plate 36 is in the flush position, the plate 36 does not interfere with the normal mounting and dismounting of the attachment 12 on the mount plate 14. In the flush position, the locking plate 36 generally closes the open face of the internal chamber 18. The locking plate 36 is preferably biased into this flush position. In the illustrated locking assembly 16, the flexible nature of the spring metal plate 36 is such that the plate 36 is naturally drawn into the flush position. However, the plate 36 could be biased into the flush position in any suitable manner.

When the locking plate 36 is in the locking position as shown in FIG. 5, the top portion of the plate 36 is at least partly spaced from the front surface 20 and at least partly removed from the open face of the internal chamber 18. When the locking plate 36 is in the locking position, the outer surface of the plate 36 forcibly engages the adjacent surface of the attachment 12 and thereby prevents the attachment from sliding relative to the mount plate 14 upwardly in the vertical direction. In this regard, the locking plate 36 is preferably sufficiently wide enough to enable the engagement between the flexible plate 36 and the attachment 12 to be spread along several points of contact to accommodate any irregularities in the contact surface of the attachment 12. This forcible engagement effectively prevents the attachment 12 from moving relative to the support B in any direction. Accordingly, with the locking plate 36 in the locking position, even the slightest of undesirable movement between the attachment 12 and the bench B (e.g., movement caused by the craftsman or someone else accidently bumping or jarring the attachment, etc.) is prevented. It will be appreciated that such a secure, locked position can save time and money in avoiding otherwise necessary recalibration or realignment of some attachments and/or applications that require precise accuracy.

In the illustrated lockable mount 10, the locking plate 36 is caused to shift into the locking position by user manipulation of the actuating screw 40. In more detail, the illustrated mount plate 14 includes an internally threaded screw-receiving bore 44 formed through the top surface 24 and extending into the internal chamber 18 to communicate therewith. The actuating screw 40 is threadably and rotatably received in the bore 44. The screw 40 is sized and configured so that it can be adjustably screwed progressively further into the bore 44. In one manner well known in the art, the top of the screw 40 includes a recessed head configured to receive a driving tool, such as an allen-type wrench (not shown), to enable the user to rotate the screw 40. The opposing end of the screw 40 includes a conical tip 40a. The tip 40a is configured so that when the head of the screw 40 is flush with the top surface 24 corresponding to the locking plate 36 being in the flush position as shown in FIG. 4 the tip 40a is sufficiently spaced from the plate 36 so that the entrapped pin 38 can be fully received between the screw 40 and the plate 36.

In this regard, the illustrated pin 38 is a solid cylindrical shaft, preferably formed of metal, that is sized and configured to be received within the internal chamber 18. When the actuator screw 40 is rotated further into the bore 44, the conical tip 40a engages the pin 38 and forces it against the upper portion of the inside surface of the locking plate 36 causing the locking plate 36 to shift into the locking position as shown in FIG. 5. It will be appreciated that as the pin 38 is forced against the locking plate 36, the flexibility of the plate 36 facilitates a constant, positive contact between the plate 36, the pin 38, and the screw 40. This positive contact enables a progressive shifting of the locking plate 36 into the locking position regardless of the attachment configuration. In order to shift the locking plate 36 back into the flush position, the actuator screw 40 is simply rotated back up the bore 44 until the pin 38 recesses back into the internal chamber 18 enabling the flexible plate 36 to spring back into the flush position.

The locking assembly 16 could be variously alternatively configured. For example, the pin 38 could be replaced with various components, such as one or more balls, etc. The flexible plate could comprise the entire front surface of the mount plate. The locking mechanism could be structure other than the flexible plate, such as retractable pins, etc. Additionally, the locking mechanism need not be screw activated, although the locking mechanism is preferably selectable by the user so that the lockable mount can optionally be used in the non-locked quick interchange normal operating mode when locking is not desired. If an actuator is utilized, the actuator is preferably accessible from the top surface as is most convenient to the user.

In operation, the mount plate 14 is first coupled to the workbench B by anchoring the plurality of screws 34 through the apertures 32 and into the bench B. The lockable mount 10 is now ready to support a selected attachment, such as the attachment 12. The dovetailing shoes 12*c* are simply slid over the top surface 24 and the attachment 12 slid along the mount plate 14 until the shoes 12*c* securely engage the side surfaces 28,30. With the locking plate 36 in the flush position, the lockable mount 10 can operate like any conventional universal mount and enables the user to rapidly remove the current attachment and quickly replace it with another attachment. If the user desires to substantially prevent all movement of the attachment 12 relative to the bench B, the user simply activates the locking assembly 16. To activate the locking assembly 16, the user inserts the wrench into the head of the actuating screw 40 and rotates the screw 40 further into the bore 44 forcing the pin 38 against the locking plate 36 and causing the plate 36 to shift. The user continues to rotate the screw 40 until the locking plate 36 is securely placed in the locking position against the attachment 12. The craftsman is now free to work on the selected workpiece without any risk that the attachment 12 will undesirably move out of the desired position relative to the workbench B. When the craftsman desires to remove the attachment from the mount 10, the craftsman simply unthreads the screw 40 until the flexible plate 36 biases back into the flush position. The attachment 12 can now be quickly and easily slid off of the mount plate 14.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An apparatus for supporting a workpiece and comprising:

a mount adapted to be coupled to a support; and a frame assembly removably coupled to said mount and adapted to movably support the workpiece, said mount including a mount plate received between the frame assembly and the support when the mount is coupled to the support, said frame assembly being slidably received on said mount plate and normally slidable in a first direction when received on said mount plate, said mount further including a locking assembly including at least one element shiftably supported relative to said mount plate, said at least one element being selectably shiftable into and out of a locking position wherein said frame assembly is prevented from sliding in said first direction, said mount plate defining a back surface that engages the support when the mount is coupled thereto and an oppositely spaced, generally planar front surface adapted to engage said frame assembly, said mount plate further including an internal chamber between said front and back surfaces.

2. The apparatus as claimed in claim 1, said first direction being generally vertical relative to the support when the mount is coupled to the support.

3. The apparatus as claimed in claim 1, said frame assembly including blocks that dovetail with said mount plate, said blocks and said mount plate being configured so that when the frame assembly is slidably received on said mount plate, said frame assembly is generally prevented from shifting in a first plane.

4. The apparatus as claimed in claim 3, said first plane being generally perpendicular to said first direction.

5. The apparatus as claimed in claim 3, said mount plate presenting a generally trapezoidal configuration.

6. The apparatus as claimed in claim 1, said at least one element comprising a flexible plate shiftably coupled to the mount plate.

7. The apparatus as claimed in claim 6, said internal chamber presenting a normally open face, said flexible plate generally closing said open face when the flexible plate is out of the locking position and being spaced from said open face when in the locking position.

8. The apparatus as claimed in claim 1, said frame assembly including first and second arms, said first arm pivotal relative to the mount about a first axis of rotation, said second arm pivotal relative to the first arm about a second axis of rotation, the first and second rotational axes essentially lying in a common plane and intersecting to define a work zone at the region of intersection thereof.

9. The apparatus as claimed in claim 8, said frame assembly including a workpiece-supporting tool assembly including structure for receiving and holding the workpiece, said second arm including an outboard portion spaced from said first arm and offset from said common plane, said outboard portion supporting a fixture for receiving said workpiece-supporting tool assembly, with said fixture and workpiece-supporting tool assembly being cooperatively oriented and configured so that a supported workpiece is located substantially at said work zone.

10. The apparatus as claimed in claim 9, said workpiece-supporting tool assembly being shiftable by pivoting of said arms to selectively alter the orientation of said workpiece while maintaining the workpiece substantially within said work zone.

* * * * *